Figure 1:
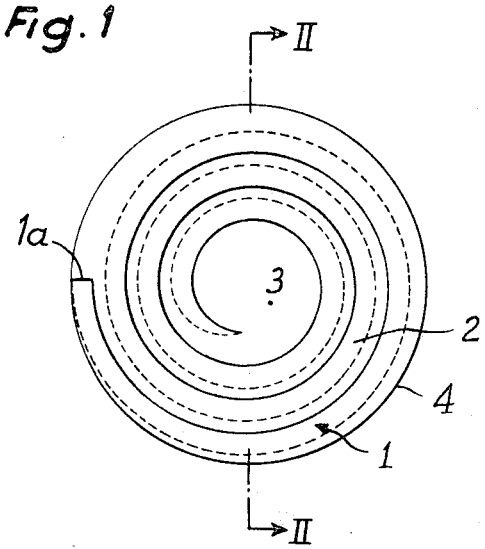

Dec. 24, 1968  R. H. DE BALSAC ET AL  3,417,777
VALVE

Filed Oct. 24, 1966  2 Sheets-Sheet 1

INVENTORS
RAYMOND HEIM DE BALSAC
DIDIER BOYER
BY
Bacon & Thomas
ATTORNEYS

3,417,777
> ## VALVE
> Raymond Heim de Balsac, 104 Ave. Raymond Poincare, and Didier Boyer, 7 rue Dupleix, both of Paris, France
> Filed Oct. 24, 1966, Ser. No. 588,873
> Claims priority, application France, Oct. 25, 1965, 36,106
> 15 Claims. (Cl. 137—525)

The invention relates to a novel valve means, more particularly for use as an artificial valve in cardiac prostheses.

It has already been suggested to replace by surgical methods diseased or damaged heart valves by artificial valves introduced into and attached to the heart by suitable means.

However, the prior art artificial valves generally have a number of disadvantages, since it is a relatively difficult matter to combine in one valve all the necessary properties to obtain flexible operation and an adequate safety margin, while avoiding factors due to the material of which the valve is made, its weight and the space it occupies which may cause organic disturbances or lesions.

Hitherto it has been found difficult to meet the following demands made on an artificial valve for use in cardiac prostheses. The valve must comprise no member whose proper mass, articulation or arrangement is affected by gravity. The valve must be able to operate in all positions occupied by the body. It must occupy as small a space as possible and be readily attachable. It must have adequate solidity to operate as long as the organism.

The valve must have adequate sealing-tightness and the minimum load loss, to relieve the organism of any extra effort. The valve must not be formed with multiple apertures of small cross-section or sharp corners liable to break the blood globules or to cause the formation of fibrin. It must be made of materials compatible with the oragnism, such as a metal, plastics, or any other suitable material.

The valve according to the invention meets these reqirements and has other advantages which will be gathered from the following description. More particularly, the more satisfactory opening of the artificial valve enables the fluid, more particularly the blood fluid, to flow more readily. The valve periphery forming the attaching device occupies less space for the same diameter than the peripheries of the prior art valve devices. Moreover, in the valve according to the invention, the fluid flows more freely through the valve.

In practice, the valve according to the invention cannot wear out or deteriorate, so that once it has been put in place it has a longer useful life and higher degree of reliability than the prior art devices.

A novel idea of the invention is, that the valve has no articulation or removable member, but operates entirely as a result of the resilience of the single material of which the valve is made. The artificial valve according to the invention also has satisfactory sealing-tightness, occupies a small amount of space, and opens completely on a very small movement of its constituent members.

The afore-mentioned features, as well as other characteristics which will become apparent from a perusal of the following description, are united in a valve according to the invention which has the shape of a resilient spiral and which can be used for all fluid flows, particularly however for the blood flow.

According to an essential feature of the invention, there is provided a valve comprising a member of flexible strip material coiled to form a resilient spiral of conical shape, which starts from a rigid annular support which may equally serve as attaching means, particularly in the annular orifice, if the valve is used as a cardiac prosthesis.

The width of said strip may vary in the direction from the central portion to the periphery of the valve, constituting the annular rigid base. Said base consists of the overlap and its connection of the outer peripheral portion of the coiled strip over the lower adjacent turn. This connection may be effected e.g. by means of rivets or welding.

A suitable pitch may be chosen for the spiral and the annular base may have a periphery of appropriate shape, particularly circular or elliptical, in order to match the shape of the orifice to the edges of which the valve has to be secured. The annular portion is pressed to form a flange perpendicular to the axis of the valve. The flange allows of fixing the valve to its seat provided within the attaching means in one direction or the other relative to said seat.

The central portion of the valve can be conical or hemispherical.

The edges of the turns partially overlap one another to produce sealing-tightness by mere contact. The edges overlap by an amount of the order of a few millimetres in the case of the valve shown by way of example in the accompanying drawings. The inside edge of one turn overlaps the outside edge of the adjacent turn, and all the turns overlap and become continuous when the valve is in the closed position, for instance as the result of pressure exerted inside the cone spiral. When the valve is open, each turn moves axially away from the adjoining turn and leaves a conical helical passage through which the fluid, more particularly the blood fluid, flows. The valve can be opened by a pressure exerted outside the cone spiral, in which case the distance to which the turns move apart is limited by the return force of the turn exerted oppositely to said pressure.

The thickness of the strip, its weight, the number of turns and their thickness are factors which may affect the choice of particular embodiments of the valve according to the invention, more particularly in relation to its size. Of course, if the valve is used for a cardiac prosthesis, it will preferably have low weight and small thickness, so long as the valve assembly maintains the required flexibility and solidity.

In the accompanying drawings there is shown one embodiment of a valve according to the invention, comprising four turns, by way of non-limitative example.

If so desired, the turns may be completely continuous or completely separated in the pressure-free condition, or the turns may be separated from one another in an intermediate position, more particularly in dependence on whether the pressure of the system into which the valve is introduced, is exerted downstream or upstream.

The valve may form one piece with the attaching means, or, on the contrary, may be separate with a view of facilitating its putting into place, whereafter the two portions are joined by appropriate means, e.g. a locking circular clip.

The material of which the valve is made is preferably a metal, such as niobium or rust-resistant, more particularly siliconized steel, or plastics. In the latter case, the valve can be produced by moulding.

Figures 2, 3:
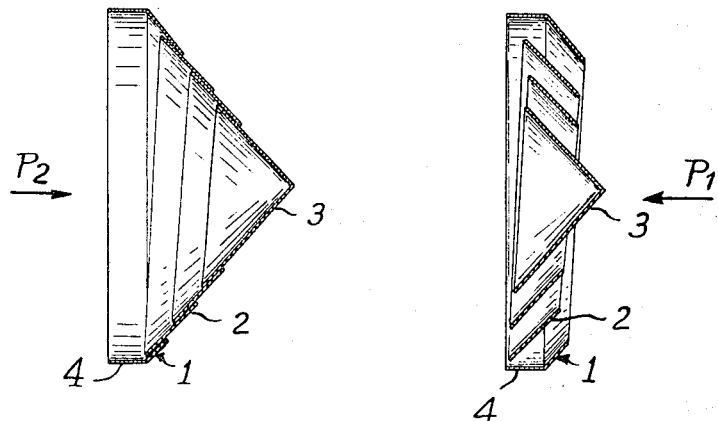
Figure 4:
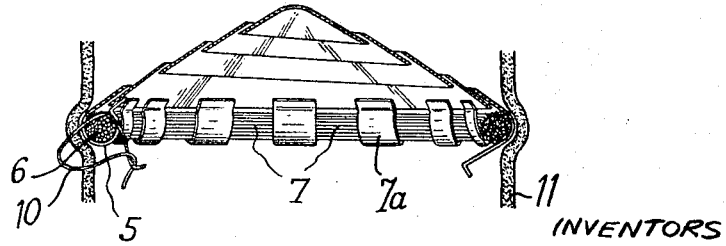
Figure 5:
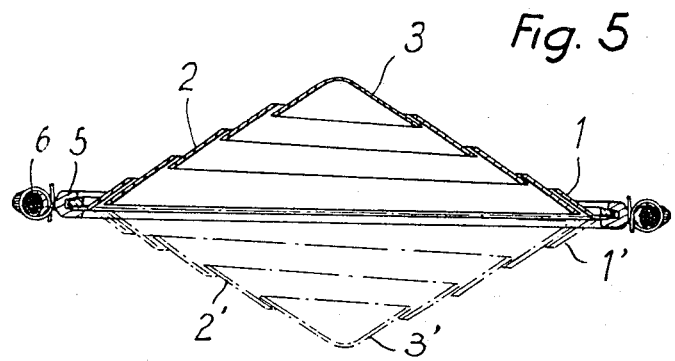
Figure 6:
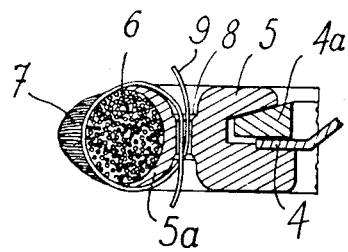
Figure 7:
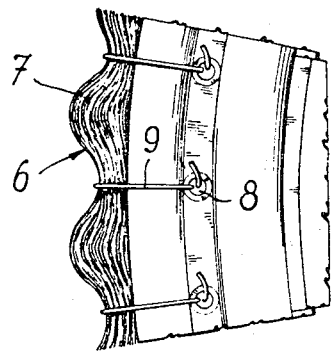

Reference is now being had to the accompanying drawings, wherein:

FIG. 1 is a diagrammatic plan view of the valve according to the invention, showing the strip which is projected in the shape of a helix, the thickness of the spiral being ignored to make the drawing clearer, FIG. 2 is a sectional view taken along the line II—II of FIG. 1, of the valve when closed by a pressure exerted in the direction of P2, FIG. 3 is a sectional view taken along the line II—II of FIG. 1 of the valve when opened by a pressure exerted in the direction P1, FIG. 4 is a sectional view of a modified embodiment of the valve, showing its method of attachment, FIG. 5 is a sectional view of a valve according to the invention and of a different manner of attachment by means of a circular clip, which is possible in the two opposite directions relative to the seat, the flange of the valve being housed in said attaching means, FIG. 6 is a blown-up partial sectional view of the attaching means according to FIG. 5, and FIG. 7 is another blown-up partial view of the attaching means according to FIG. 5, showing in particular the filaments required for the attachment.

Particularly in FIGS. 1 and 2, there is shown the peripheral turn 1 of the annular base, overlapping and fixed to the lower adjacent turn 2 at 1a and the central portion 3 of the valve. Similarly, in FIGS. 2 and 3 there is shown an attachment flange 4, connected with the rigid annular base 1.

The drawings clearly show how the valve according to the invention operates and how the requirements set forth hereinbefore are satisfactorily met. The conical or spherical central portion of the valve ensures its centering and the hydrodynamic flow of the blood. The coiling of the valve guarantees the rigidity of the assembly under a pressure exerted in the direction P2, sealing-tightness being automatically produced by such pressure (see FIG. 2).

The long-term operation of the valve according to the invention with adequate solidity is shown by the working rate of the material of which the valve is made. Experience has shown that the cross-section of the circular aperture in which the valve is mounted is substantially equal to the cross-section of the conical helical passage between the turns of the valve when the nose thereof is moved by the pressure in relation to its closure position by an amount substantially equal to one quarter of the valve diameter.

The very small amount of space occupied by the valve according to the invention is determined straight-forwardly as follows: if the angle=90° is taken, and the central portion of the valve is spherical, the dimension H corresponds to about 0.5 d. for closure and 0.375 d. for opening.

When the valve is used in a cardiac prosthesis, it can be attached by any appropriate means, preferably the means described hereinafter and illustrated in FIGS. 4, 5, 6 and 7.

As to be seen from FIG. 1, a hollow rim 5, made of the same material as the valve, received a strand 6 of filaments made of silk or plastics which are well tolerated by the organism, e.g. materials of the nylon, Dacron or Teflon type. The strand of filaments 6 can be retained in the groove of the rim by small mouse-tooth hooks 7a, spaced out a few millimetres from one another.

As to be seen from FIGS. 5, 6 and 7, said strand 6 is maintained in the groove of rim 5a by a thread 9 of appropriate material which is inserted into a series of holes 8, spaced from each other at a distance of some millimetres, so that a series of loops is formed. Said thread 9 is blocked at each hole 8 by a knot, a weld or any other suitable method.

As to be seen from FIGS. 4, 5, 6 and 7, the strand 6 of filaments can be reached by the surgeon in free spaces 7, who can introduce at such places surgical threads 10 to connect the valve to the surrounding tissues 11.

The artificial valve as such is joined with its attaching means and locked either by means of hooks (see FIG. 4), or by means of a circular clip (see FIGS. 5, 6 and 7). Locking may be effected prior to mounting, and the whole valve assembly is subsequently put into place, or locking may be effected by the surgeon after the attaching means have been separately put into place.

In its application as a heart valve, the valve according to the invention is very well adapted to the blood flow, i.e. unidirectional successive jerks.

Owing to its resilience the valve according to the invention opens and closes exclusively in response to variations in blood pressure, i.e. in a manner which allows of attaining the desired aims.

Other advantages of the said valve, such as its solidity, the small space it takes up, and its reduced weight and inertia have already been referred to hereinbefore. In fact, since the concept of the valve is that of a spring, it represents the type of mechanical device which is the least liable to wear.

The valve according to the invention takes up less space than other known heart valves.

Further advantages of the valve according to the invention in its application as a heart valve are the following:

It is possible to separately secure its attaching means, i.e. the ring maintaining the spiral, to the tissues, which facilitates the surgeon's work and allows of gaining time and increasing the security of manual heart operations with artificially maintained circulation.

The valve can be mounted in any desired direction, i.e. either on an arterial or auriculoventricular orfice, provided its diameter is adapted to each use.

Its low weight and low inertia, and the fact that the valve according to the invention only takes up a small space, enable it to be readily and rapidly secured to the heart, and it is thus particularly useful as a valvular prosthesis in cases where a bi- or tri-valvular prothesis is required.

Test dogs fitted with the valve according to the invention behaved satisfactorily in tests carried out thereon.

Of course, the valve according to the invention can be applied to fields other than cardiac prostheses. The novel concept which entails the original functioning of the valve according to the invention enables same to be used in a general manner, e.g. on pipes through which fluids circulate, and for other industrial uses requiring more particularly lightweight valves which occupy little space and operate in a simple and reliable manner.

What we claim is:

1. A valve comprising a member of flexible strip material coiled to form a resilient spiral of conical shape which starts from a rigid annular support, the width of said strip varying in the direction from the central portion of the valve to its periphery, constituting the annular rigid base, said base consisting of the overlap of the outer peripheral portion of the coiled strip and its connection to the lower adjacent turn.

2. A valve according to claim 1, wherein a rigid base member is secured to the outermost turn of the coiled member by rivets.

3. A valve according to claim 1, wherein a rigid base member is secured to the outermost turn of the coiled member by welding.

4. A valve according to claim 1, wherein the annular base member of the valve is pressed in order to facilitate centering and mounting of said valve in one direction or the other relative to its attaching means.

5. A valve according to claim 1, wherein the said outermost turn is of circular shape.

6. A valve according to claim 1, wherein the said outermost turn is of elliptical shape.

7. A valve according to claim 1, wherein the central portion of the coiled member is of conical shape.

8. A valve according to claim 1, wherein the central portion of the coiled member is of hemispherical shape.

9. A valve according to claim 1, wherein the turns of the coiled member are separated from each other in a pressure-free condition of the valve.

10. A valve according to claim 1, wherein the turns of the coiled member engage in overlapping relationship with each other in the pressure-free condition of the valve.

11. A valve according to claim 1, wherein the coiled member is of a metallic material.

12. A valve according to claim 1, wherein the coiled member is of a synthetic plastics material.

13. A valve according to claim 12, comprising attaching means which are integral with said valve and enable same to be attached to a patient for use as an artificial valve in cardiac prostheses.

14. A valve assembly, comprising a valve according to claim 13, wherein separate attaching means are joined to said valve by means of hooks.

15. A valve assembly, comprising a valve according to one of the preceding claims 1-13 and separate attaching means which are joined by means of a locking circular clip.

References Cited

UNITED STATES PATENTS

| 2,859,771 | 11/1958 | Blagg | 137—525 XR |
| 3,342,208 | 9/1967 | Steffes | 137—525 XR |

FOREIGN PATENTS

| 15,970 | 7/1914 | Great Britain. |
| 20,861 | 11/1893 | Great Britain. |
| 116,515 | 9/1929 | Austria. |
| 500,753 | 4/1927 | Germany. |
| 528,623 | 4/1927 | Germany. |
| 1,301,646 | 7/1962 | France. |

STANLEY N. GILREATH, *Primary Examiner.*

WERNER H. SCHROEDER, *Assistant Examiner.*